(12) United States Patent
Osswald et al.

(10) Patent No.: US 8,503,290 B2
(45) Date of Patent: *Aug. 6, 2013

(54) COMMUNICATING DATA UNITS IN A COMMUNICATIONS NETWORK THAT PROVIDES FAILURE PROTECTION

(75) Inventors: John J. Osswald, Northbridge, MA (US); Robert J. Friskney, Harlow (GB); Michael K. Poon, Westford, MA (US); Florin S. Balus, Cupertino, CA (US); Simon P. Parry, Harlow (GB)

(73) Assignee: Rockstar Consortium US LP, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,184

(22) Filed: Jun. 13, 2012

(65) Prior Publication Data
US 2012/0250499 A1 Oct. 4, 2012

Related U.S. Application Data

(63) Continuation of application No. 11/642,202, filed on Dec. 20, 2006, now Pat. No. 8,213,300.

(51) Int. Cl.
*H04L 12/28* (2006.01)
(52) U.S. Cl.
USPC ............................ 370/218; 370/228; 709/239
(58) Field of Classification Search
None
See application file for complete search history.

(56) References Cited

U.S. PATENT DOCUMENTS

| 7,345,991 | B1 * | 3/2008 | Shabtay et al. ............... 370/221 |
|---|---|---|---|
| 7,477,593 | B2 | 1/2009 | Scudder et al. |
| 7,535,828 | B2 * | 5/2009 | Raszuk et al. ................ 370/219 |
| 7,710,902 | B2 | 5/2010 | Vasseur et al. |
| 8,213,300 | B1 * | 7/2012 | Osswald et al. .............. 370/218 |
| 2003/0097470 | A1 | 5/2003 | Lapuh et al. |
| 2007/0008982 | A1 | 1/2007 | Voit et al. |
| 2007/0076719 | A1 * | 4/2007 | Allan et al. ................... 370/392 |

OTHER PUBLICATIONS http://en.wikipedia.org/wiki/802.1ah, "802.1ah" definition from Wikipedia, p. 1 (at least as early as Nov. 2, 2006).
http://en.wikipedia.org/wiki/Provider_Backbone_Transport, "Provider Backbone Transport", definition from Wikipedia, p. 1 (at least as early as Nov. 2, 2006).
Network Working Group, Internet Draft, "Application of PWE3 to MPLS Transport Networks, draft-bryant-pwe3-mpls-transport-00", pp. 1-12 (Oct. 13, 2006).
TPACK A/S, "PBT Carrier Grade Ethernet Transport", 17 pages (2006).
SysKonnect White Paper, "Link Aggregation according to IEEE 802.3ad", 19 pages (2002).
J. Osswald, U.S. Appl. No. 11/298,822, "Method and Apparatus for Increasing the Scalability of Ethernet OAM", filed Dec. 8, 2005, pp. 1-16, Figs. 1-8.

* cited by examiner

*Primary Examiner* — Brian Roberts
(74) *Attorney, Agent, or Firm* — Pearne & Gordon LLP

(57) ABSTRACT

A node comprises a first communications interface to a customer network element, where the first communications interface is part of a group of communications interfaces to the customer network element to provide failover support. The node further includes a network interface to communicate over a trunk group to other nodes, where the trunk group includes a primary trunk and a secondary trunk. Just one of the primary and secondary trunks is active for communicating data units.

19 Claims, 5 Drawing Sheets

COMMUNICATING DATA UNITS IN A COMMUNICATIONS NETWORK THAT PROVIDES FAILURE PROTECTION

TECHNICAL FIELD

The invention relates generally to communicating data units in a communications network that provides failure support.

BACKGROUND

Communications networks are implemented to enable the transport of information among users and devices. Examples of such networks include local area networks (LANs), wide area networks (WANs), the Internet, and so forth. Communications networks typically include switching nodes (such as Ethernet switches) that are able to receive packets, read the target address of each received packet, and forward each packet to the appropriate port associated with the target network segment. Other types of network elements in a communications network include routers, bridges, hubs, and other network devices that are coupled together and configured to pass data to one another. Data is communicated through the communications network in protocol data units, such as frames, packets, cells, or segments between network elements by utilizing one or more communications links.

Some communications networks, such as networks that implement Split Multilink Trunking (SMLT), provide for failure protection mechanisms to address points of failure in the communications networks. Such failure protection mechanisms provide for a technique to re-route around single points of failure within a communications network.

SUMMARY

In general, according to an embodiment, a node includes a first communications interface to a customer network element, where the first communications interface is part of a group of communications interfaces to the customer network element to provide failover support. The node further includes a network interface to communicate over a trunk group to other nodes, the trunk group including a primary trunk and a secondary trunk, where just one of the primary and secondary trunks is active for communicating data units.

Other or alternative features will become apparent from the following description, from the drawings, and from the claims.

DETAILED DESCRIPTION

Figure 1:
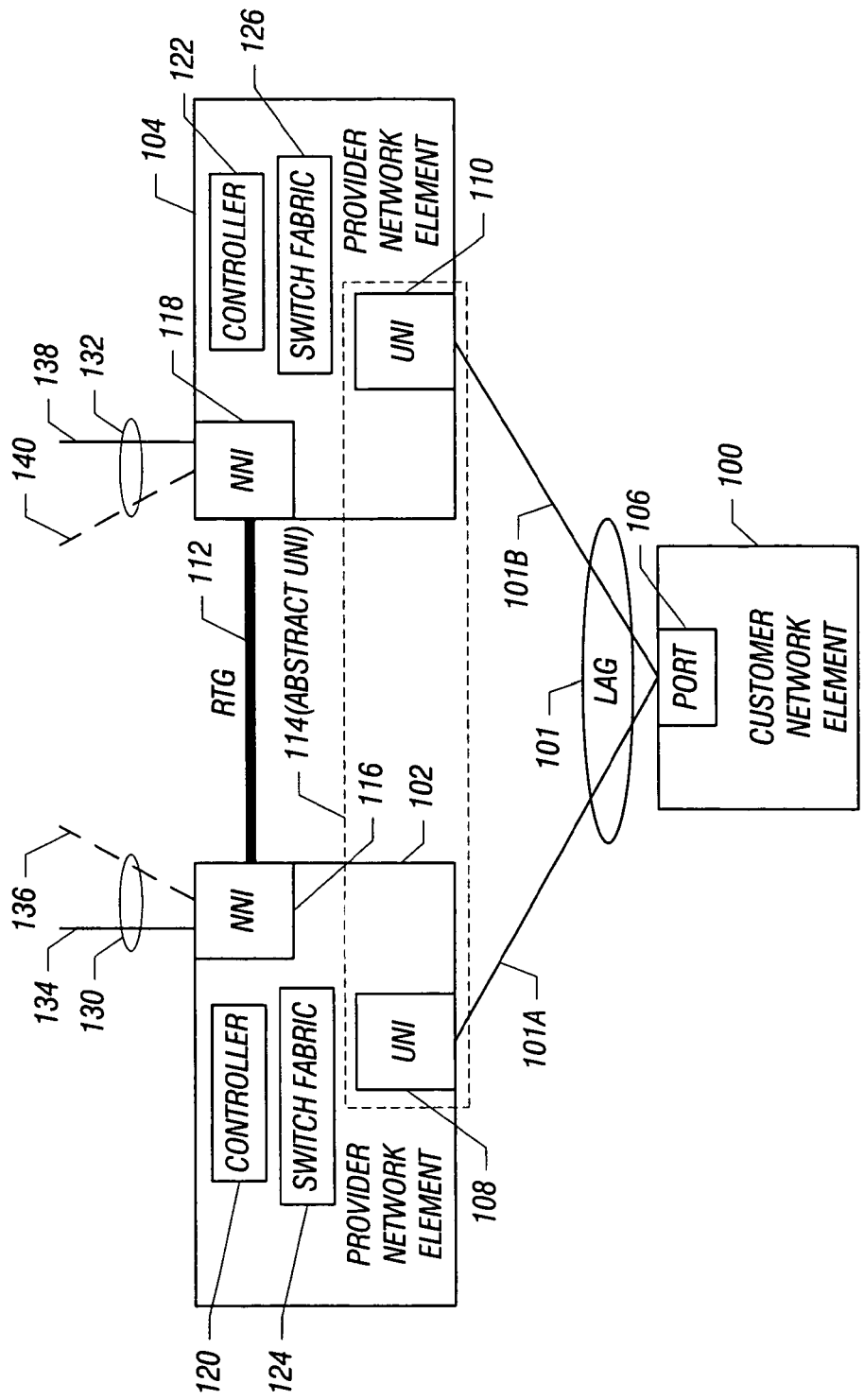
FIG. 1 is a block diagram of an arrangement of network elements, according to an embodiment.

In the following description, numerous details are set forth to provide an understanding of some embodiments. However, it will be understood by those skilled in the art that some embodiments may be practiced without these details and that numerous variations or modifications from the described embodiments may be possible.

In accordance with some embodiments of the invention, a failure protection mechanism is provided to re-route data units around points of failure within a communications network. The communications network includes various network elements coupled by communications links. In some embodiments, the failure protection mechanism is provided in the context of communications networks that employ provider backbone bridging (PBB), which is to be standardized as IEEE (Institute of Electrical and Electronics Engineers) 802.1ah. PBB, also referred to as MAC-in-MAC (MAC stands for medium access control), allows an Ethernet network (Ethernet is a networking technology that has been standardized as IEEE 802) to be treated as separate service provider and customer domains, such that a demarcation can be provided between the customer domain and the service provider domain.

PBB allows the MAC addresses of the customer and provider domains to be isolated from each other. The customer domain MAC addresses are used to route data units between customer network elements, whereas the provider domain MAC addresses are used to route data units among provider network elements. A provider network element is a network element (e.g., a switch, router, hub, bridge, etc.) in the core network of the service provider. A customer network element (e.g., a switch, router, hub, bridge, etc.) is a network element associated with the customer (e.g., an end user, an organization, etc.). Note, however, that the customer network element can either be physically located at a customer site or at a service provider site.

Although reference is made to PBB in the ensuing discussion, it is noted that failure mechanisms according to some embodiments can be used in communications networks that employ other types of protocols for communications.

Virtual or logical connections are defined between provider network elements in the core network (the part of the overall network associated with the service provider). Virtual or logical connections are different from the underlying physical connections between network elements. The virtual or logical connections between provider network elements can include trunks, trunk groups, or re-route trunk groups (RTGs). A trunk group refers to a group of multiple trunks. In the Ethernet context, a trunk is established between a pair of network-to-network interfaces (NNIs). The trunk established between the pair of NNIs is a virtual or logical connection, and not necessarily a physical connection. In some implementations, the trunks used in the service provider core network are provider backbone transport (PBT) trunks. PBT is based on Ethernet technology, and provides a connection-oriented, packet-switched transport layer.

In one example implementation, PBB can be run on a network that implements Split Multilink Trunking (SMLT). The SMLT architecture provides a failure management scheme in which re-routing around points of failure in the communications network can be accomplished. Note that SMLT provides failure protection at the physical level, whereas the failure protection mechanisms according to some embodiments is provided at the logical level. PBT is currently in the process of being standardized by the IEEE. A PBT has a built-in failure protection mechanism. Although a PBT can run over an SMLT or MLT (multilink trunk), the failure protection mechanism provided by the SMLT or MLT is not utilized.

In other embodiments, instead of using PBT trunks, paths based on T-MPLS (Transport Multiprotocol Label Switching) can be used instead. Different versions of T-MPLS are described in ITU-T (International Telecommunication Union Telecommunication Standardization Sector) G.8110.1, and IETF (Internet Engineering Task Force) Internet Draft, entitled "Application of PWE3 to MPLS Transport Networks," dated October 2006, by S. Bryant.

A re-route trunk group (RTG) is a trunk group interconnects two provider network elements to allow the transport of data units between the network elements in case of failure of a communications interface (more specifically, a user-to-network interface or UNI in one example) of one of the network elements. A UNI is used to interconnect a customer network element and a provider network element.

FIG. 1 shows an example of a customer network element 100 connected to provider network elements 102 and 104 (e.g., edge switches in a service provider core network). In the example depicted in FIG. 1, the connections between the customer network element 100 and the provider network elements 102, 104 are based on link aggregation (LAG) according to IEEE 802.3. Link aggregation is a trunking technique of combining physical network links (101A and 101B in FIG. 1) into a single logical link (represented as 101) for increased bandwidth. Although normally link aggregation is used to aggregate links between one customer network element and a corresponding provider network element, the link aggregation according to some embodiments is used for aggregating links between one customer network element and plural provider network elements (such as in the arrangement depicted in FIG. 1).

Other types of connections can be employed to interconnect the customer network element 100 to provider network elements 102, 104 in other implementations.

The customer network element 100 includes a port 106 that is interconnected to corresponding UNIs 108, 110 in respective provider network elements 102, 104. The configuration depicted in FIG. 1 is a dual-homed configuration to provide dual-homed UNI service to the customer network element 100. The UNIs 108, 110 (referred to as "dual-homed UNIs") effectively provide an abstract UNI 114 to allow the customer network element 100 (referred to as a "dual-homed customer network element") to connect to two UNIs on different provider network elements 102, 104, across link aggregation 101. In one implementation, the abstract UNI 114 allows an IEEE-802.3-compliant customer network element 100 to connect to two provider backbone bridge (PBB) UNIs in corresponding IEEE-802.1ah and PBT (provider backbone transport)-compliant provider network elements.

In accordance with some embodiments, the failure protection mechanism is provided by use of the dual-homed configuration and alternate trunk paths provided in the core network. The failure protection mechanism enables a dual-homed customer network element 100 to communicate with high availability across a communications network that has alternate trunk paths. A first type of alternate trunk path depicted in FIG. 1 is a re-route trunk group (RTG) 112 that interconnects provider network elements 102, 104. The re-route trunk group 112 includes one or more trunks and is connected between NNIs 116 and 118 in respective provider network elements 102 and 104.

The re-route trunk group 112 allows a data unit to bypass a defective UNI such that the data unit can be routed to a destination customer network element. For example, assuming that the UNI 108 of the provider network element 102 is defective, a data unit received by the provider network element 102 from another network element (not shown) is routed through the NNI 116 over the re-route trunk group 112 to NNI 118 in the network element 104. The network element 104 in turn routes the data unit through the UNI 110 to the port 106 of the customer network element 100.

More specifically, a re-route trunk group is a logical trunk group between two provider network elements containing dual-homed UNIs. If a data unit arrives from an NNI, and the local dual-homed UNI is down, the data unit is re-encapsulated and sent across the re-route trunk group to the peer UNI. If a data unit received from a re-route trunk group is transferred to another re-route trunk group, a loop may occur. Consequently, a data unit arriving from a re-route trunk group to a local UNI that is down should be dropped. The re-route trunk group is normally dormant, and is used only when a connection between a UNI and a customer network element fails.

A second type of alternate trunk path depicted in FIG. 1 is a trunk group that has a primary trunk and a secondary trunk. In FIG. 1, a first trunk group 130 is connected to NNI 116 in the provider network element 102, and a second trunk group 132 is connected to NNI 118 in provider network element 104. The trunk group 130 has a primary trunk 134 and a secondary trunk 136; and the trunk group 132 has a primary trunk 138 and a secondary trunk 140. Note that in each trunk group, just one of the primary and secondary trunks is active; in other words, data units that are communicated over the trunk group are routed over just one of the primary and secondary trunks, but not on the other of the primary and secondary trunks. Thus, if the primary trunk of a particular trunk group is active, then data units are routed over the primary trunk group, without routing data units over the secondary trunk of the particular trunk group. On the other hand, if the secondary trunk of a particular trunk group is active, then data units are routed over secondary trunk without routing data units over the primary trunk of the particular trunk group.

Note that any particular trunk is capable of simultaneously being a primary trunk for one trunk group, a secondary trunk for another trunk group, and a member of a re-route trunk group.

The intelligence of the provider network elements 102, 104 is provided by respective controllers 120, 122, which can be part of the control planes of the respective provider network elements 102, 104. The controllers 120, 122 can be implemented with software, hardware, or a combination of both. Switch fabrics 124 and 126 are also provided in respective provider network elements 102, 104 to perform switching (or routing) tasks with respect to data units.

Figure 2:
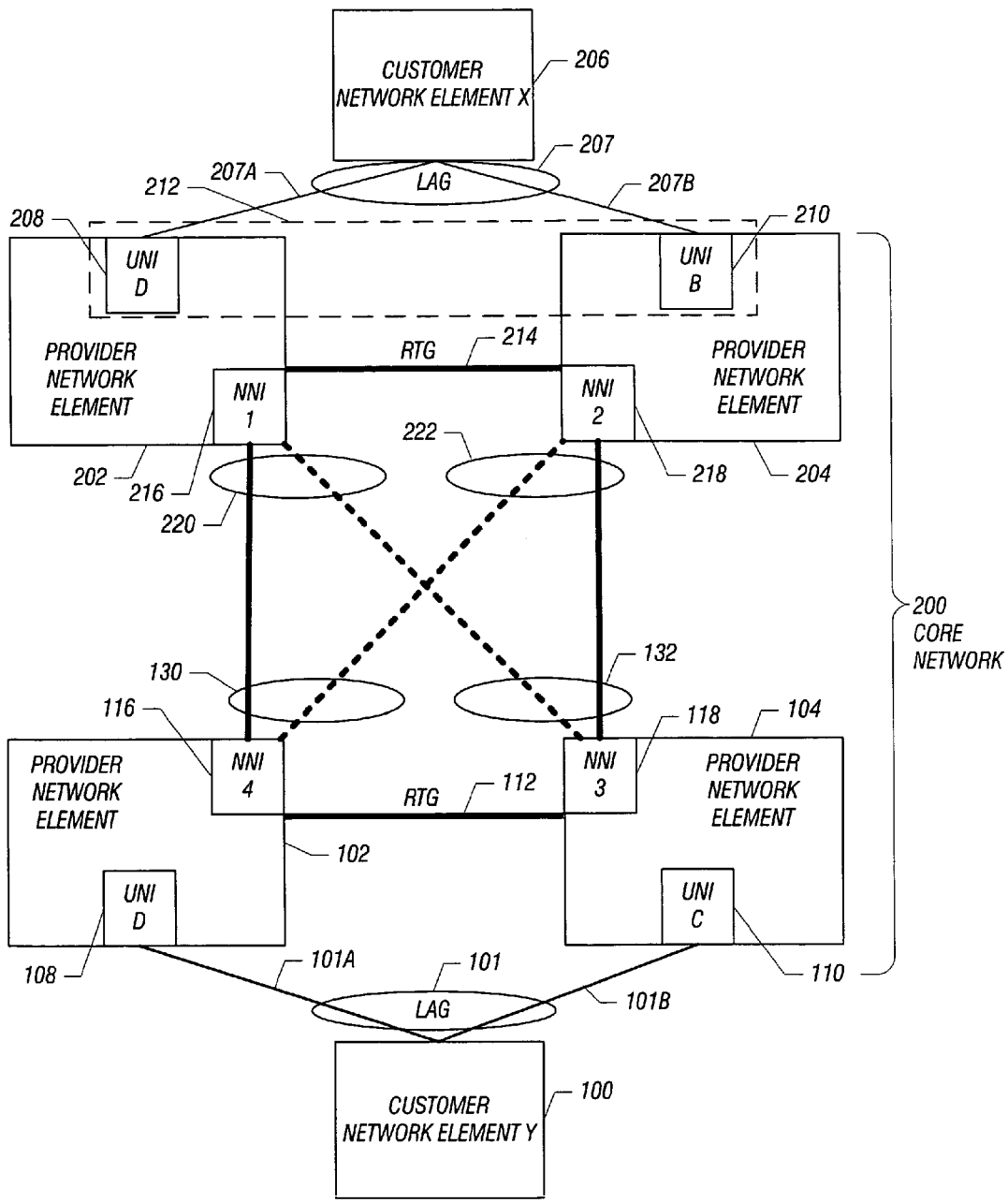
FIGS. 2-4 are block diagrams of various arrangements of network elements, according to some embodiments.

There are various possible arrangements of network elements based on the use of the dual-homed configuration and alternate trunk paths discussed above. Some of these arrangements are discussed below. FIG. 2 shows a cross-square path configuration that includes the network elements and connections depicted in FIG. 1 plus additional network elements and connections. In the cross-square path configuration, a cross-connection is provided between a first pair of provider network elements 102, 104, and a second pair of provider network elements 202, 204, in a core network 200. FIG. 2 also shows a second customer network element 206 that is connected to the pair of provider network elements 202, 204 over respective links 207A, 207B that have been aggregated into a logical link 207 according to link aggregation (LAG). Like the customer network element 100, the customer network element 206 is also a dual-homed customer network element, where UNIs 208, 210 (in respective provider network elements 202, 204) are dual-homed UNIs that provide an abstract UNI 212 for the customer network element 206.

FIG. 2 also shows a re-route trunk group 214 connected between NNIs 216, 218 of respective provider network elements 202, 204. The re-route trunk group 214 is used to provide an alternate trunk path in case of failure of one of the UNIs 208, 210 of the abstract UNI 212.

To interconnect the pair of provider network elements 102, 104 and the pair of provider network elements 202, 204 in the cross-square path configuration, four trunk groups 220, 222, 130, and 132, are provided (interconnected between different NNIs of the provider network elements). The trunk group 220 interconnects the provider network element 202 to provider network elements 102, 104; the trunk group 222 interconnects the provider network element 204 to provider network elements 102, 104; the trunk group 132 interconnects the provider network element 104 to provider network elements 202, 204; and the trunk group 130 interconnects the provider network element 102 to provider network elements 202, 204. Each trunk group has a primary trunk (depicted as a solid line) and a secondary trunk (depicted as a dashed line). Note that each NNI depicted in FIG. 2 can have multiple physical ports such that the primary and secondary trunks of a trunk group are connected to different ports of the NNI. Connecting different trunks to different physical ports of an NNI reduces the likelihood that failure at one physical port of the NNI will cause failure of both the primary and secondary trunks.

As noted above, for each trunk group interconnecting a provider network element to two other provider network elements, the primary trunk of the trunk group is employed so long as the primary trunk is available (functioning). In other words, when the primary trunk is available, the secondary trunk of the trunk group is not used for communicating data units. However, if the primary trunk of a trunk group fails for any reason (such as due to the underlying physical cables malfunctioning or an NNI malfunctioning), data units are communicated over the secondary trunk instead of the primary trunk.

For implementations in which the trunks in the core network 200 are implemented with PBTs, routing of data units is based on a virtual local area network (VLAN) identifier (VID) and a destination MAC address, which are contained in the header of the data unit. Moreover, according to PBB, MAC-in-MAC encapsulation is performed in each data unit, where the customer MAC header (containing the source and destination MAC addresses of the customer network elements involved in the data communication) is encapsulated within a service provider MAC header (containing the backbone source and destination MAC addresses associated with provider network elements).

A data unit communicated through the core network 200 also includes a service instance identifier (I-SID) that identifies a service instance. A service instance refers to a particular flow of data in the communications network. There can be many service instances active in the communications network, which are assigned corresponding I-SIDs. A particular service instance, as identified by the corresponding I-SID, is assigned to particular trunk groups such that the provider network elements know the specific trunk groups that a data unit of the service instance should follow. Consequently, since the trunk groups associated with a particular service instance are provisioned, no signaling has to be performed between peer network elements during routing of data units associated with the particular service instance. Also, an I-SID is used to identify one of multiple UNIs in a provider network element—thus, when a data unit arrives at an NNI of a provider network element, the NNI knows which UNI will be the egress UNI based on the I-SID of the data unit.

An example communication of a data unit during a normal state (a state in which failure has not occurred in the NNIs, UNIs, or the trunks/links connected to the NNIs/UNIs) is described in the context of FIG. 2. A data unit from the origination customer network element 206 enters the core network 200 through UNI 208 of the provider network element 202, with the data unit arriving on UNI 208 being classified to a specific service instance identifier (I-SID). The data unit is then PBB-encapsulated, where the PBB-encapsulated data unit has the following header information (among others): I-SID and MAC-in-MAC encapsulation. The PBB-encapsulated data unit is provided from the NNI 216 of the provider network element 202 over trunk group 220 using the primary trunk, with the data unit arriving at NNI 116 of provider network element 102. The I-SID contained in the data unit steers the data unit from NNI 116 of the provider network element 102 to the local UNI 108 of the provider network element 102, where the UNI 108 decapsulates the data unit and sends the decapsulated data unit to the destination customer network element 100.

In a normal state, a data unit received at UNI 210 of the provider network element 204 from the origination customer network element 206 follows a similar path over a different trunk group, with the data unit passed from UNI 210 to NNI 218 and over the primary trunk of the trunk group 222 to the NNI 118 in the provider network element 104. The NNI 118 then passes the data unit to the UNI 110 in the provider network element 104, which data unit then egresses from the UNI 110 to the destination customer network element 100.

Note that data units associated with the same service instance from the origination customer network 206 will be classified to the same I-SID by either UNI 208 or UNI 210 in respective provider network elements 202, 204 (origination side of the core network 200). This feature according to some embodiments of the invention allows either of dual-homed UNIs to classify data units of the same service instance to the corresponding I-SID. Also, since the I-SID is the same, it does not matter whether a data unit egresses at UNI 108 or UNI 110 at the destination side of the core network 200, since either UNI 108 or 110 is capable of decapsulating the data unit and forwarding the data unit to customer network element 100. By using dual-homed UNIs according to some embodiments that are able to recognize that data units associated with the same service instance have the same I-SID, effective failover operation is provided to allow data units of a particular instance to follow different paths through the core network 200 between origination and destination customer network elements.

In the example of FIG. 2, there are eight possible PBT paths between customer network elements 100 and 206. In the paths identified below, customer network element 206 is labeled "X," UNI 208 is labeled "A," UNI 210 is labeled "B," NNI 216 is labeled "1," NNI 218 is labeled "2," NNI 118 is labeled "3," NNI 116 is labeled "4," UNI 110 is labeled "C," UNI 108 is labeled "D," and customer network element 100 is labeled "Y." According to the above labels, the following are the eight possible PBT paths from customer network element "X" to customer network element "Y":

XA14DY
XA13CY
XB23CY
XB24DY
XA143CY
XA134DY
XB234DY
XB243CY

In the above example, the path XA14DY represents a path originating at customer network element X, passing through UNI A, NNIs 1 and 4, UNI D, and arriving at customer network element Y. The path XA143CY originates at customer network element X, passes through UNI A, NNIs 1, 4, and 3, UNI C, and arrives at customer network element Y. In the above example, the first four paths are used to handle core network failures. The latter four paths are used to handle edge failures.

In the reverse direction from customer network element Y to customer network element X, a similar set of eight paths is provided. The protection mechanism according to some embodiments allows customer network elements to continue to communicate even after multiple nodal failures.

An edge failure is a failure of a UNI or a link between the UNI and the destination customer network element. As discussed above, in the event of an edge failure, the re-route trunk group is used to transport data units to the peer dual-homed UNI. An edge failure can be detected based on monitoring a link state of the link between a provider network element and a customer network element, or alternatively, based on exchange of ping or keep-alive messages (e.g., ping messages defined by the Link Aggregation Control Protocol, or LACP, defined by IEEE 802.3).

A core failure is a failure of any of the core network provider elements or the paths between the provider network elements, with the exception of re-route trunk groups. As depicted in FIG. 2, each trunk group (220, 222, 130, 132) has trunks (primary and secondary trunks) connecting one provider network element to two other provider network elements having corresponding UNIs of a dual-homed pair of UNIs. As discussed above, in the event of a core failure, the trunk group will switch the traffic to a different provider network element (over the secondary trunk) and ultimately to a different egress UNI of the dual-homed UNI pair.

Core failures are detected based on transmission of keep-alive messages over trunks (such as PBTs) between provider network elements. If a keep-alive message has not been received by a particular provider network element from a peer provider network element after some timeout interval, then the particular provider network element marks the trunk to the peer provider network element as down.

In one example of a core failure in the arrangement of FIG. 2, it is assumed that the communication is not possible from the provider network element 202 to the provider network element 102. In this scenario, the provider network element 202 will switch routing of the data unit that would previously have been routed over the primary trunk of the trunk group 220 to the secondary trunk of the trunk group 220. After failover, data units are routed over the secondary trunk from NNI 216 to NNI 118 in network provider element 104. The provider network element 104 then forwards a decapsulated data unit from UNI 110 to the destination customer network element 100.

In an example of an edge failure in the FIG. 2 arrangement, assume that UNI 108 has failed. In this case, a data unit encapsulated by UNI 208 is routed from NNI 216 over the primary trunk to NNI 116 in the provider network element 102. Since the UNI 108 is down, the data unit is sent over the re-route trunk group 112 to NNI 118, which forwards the data unit to UNI 110. The UNI 110 then decapsulates the data unit for forwarding to the destination customer network element 100.

Figure 3:
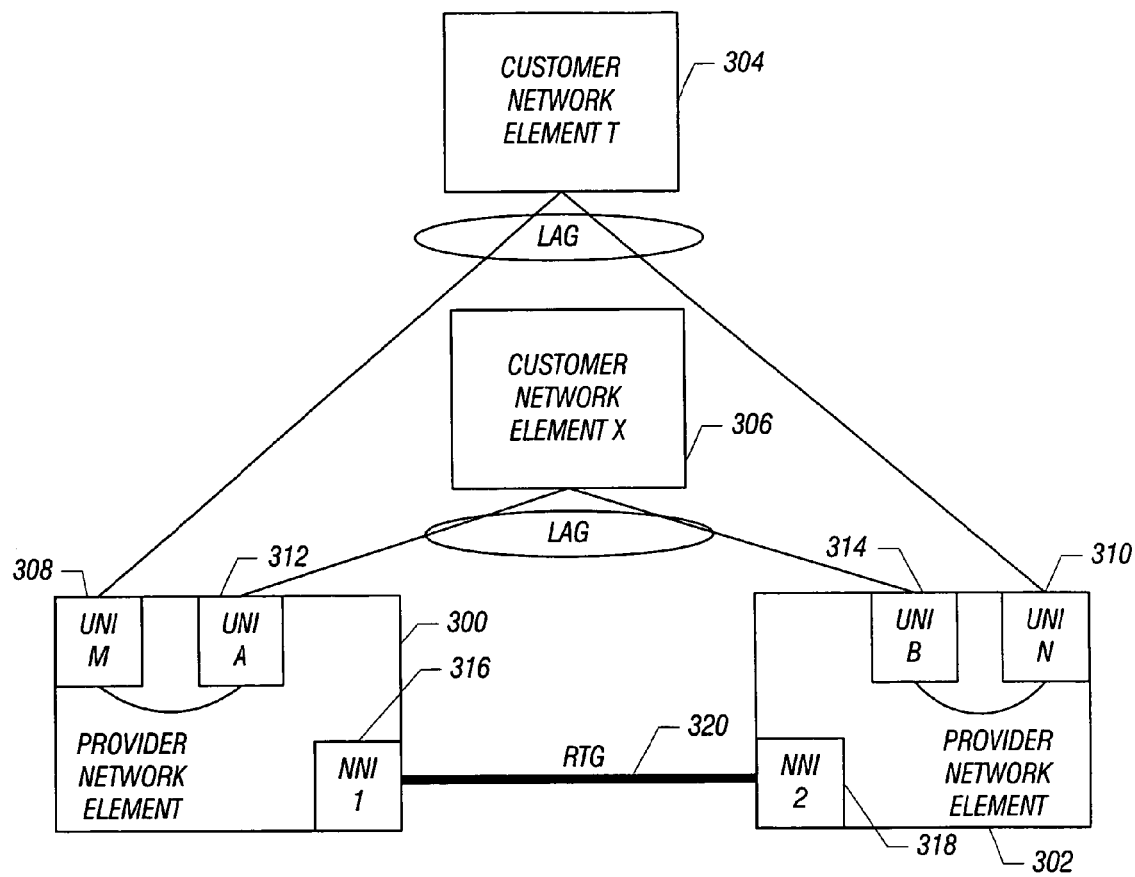

Note that a provider network element does not know the state of UNIs on other provider network elements. Therefore, a provider network element should assume that the UNIs of other provider network elements are down. Thus, if two customer network elements are connected to the same provider network element, then the preference is to switch data units inside the provider network element without involving another provider network element for communication of data units between the two customer network elements. An example of this scenario is depicted in FIG. 3 (which shows a local connection configuration), where provider network elements 300 and 302 are each connected to both of customer network elements 304 and 306. Customer network element 304 is connected to dual-homed UNIs 308 and 310 (that provide an abstract UNI) in respective provider network elements 300 and 302. Similarly, customer network element 306 is connected to dual-homed UNIs 312 and 314 (that provide an abstract UNI) in respective provider network elements 300 and 302. The provider network element 300 also includes an NNI 316 that is connected to an NNI 318 in the provider network element 302, where the connection between NNIs 316 and 318 is a re-route trunk group 320.

In a normal state (no failure of nodes or connections are present), a data unit from customer network element 304 destined to customer network element 306 is received by UNI 308. UNI 308 encapsulates the data unit and forwards the data unit to the local destination UNI 312 rather than to an NNI (e.g., 316) for processing by another provider network element. A "local destination UNI" refers to the UNI of a provider network element that is connected to the customer network element. By routing the data unit to the local destination UNI 312, the same provider network element 300 can be used to switch the data unit to the destination customer network element without involving another provider network element.

However, in the example of FIG. 3, if the local destination UNI 312 is down, then the data unit from customer network element 304 to customer network element 306 would have to be routed from UNI 308 to NNI 316 and over RTG 320 to NNI 318 in the separate provider network element 302. The data unit is then forwarded to UNI 314 in the provider network element 302 for decapsulation and routing to the destination customer network element 306.

Assuming the customer network element 304 is labeled "T," customer network element 306 is labeled "X," UNI 308 is labeled "M," UNI 312 is labeled "A," NNI 316 is labeled "1," NNI 318 is labeled "2," UNI 314 is labeled "B," and UNI 310 is labeled "N," then the four possible paths from "T" to "X" are:

TNBX
TN21AX
TMAX
TM12BX

A similar set of four possible paths are available from "X" to "T."

Figure 4:
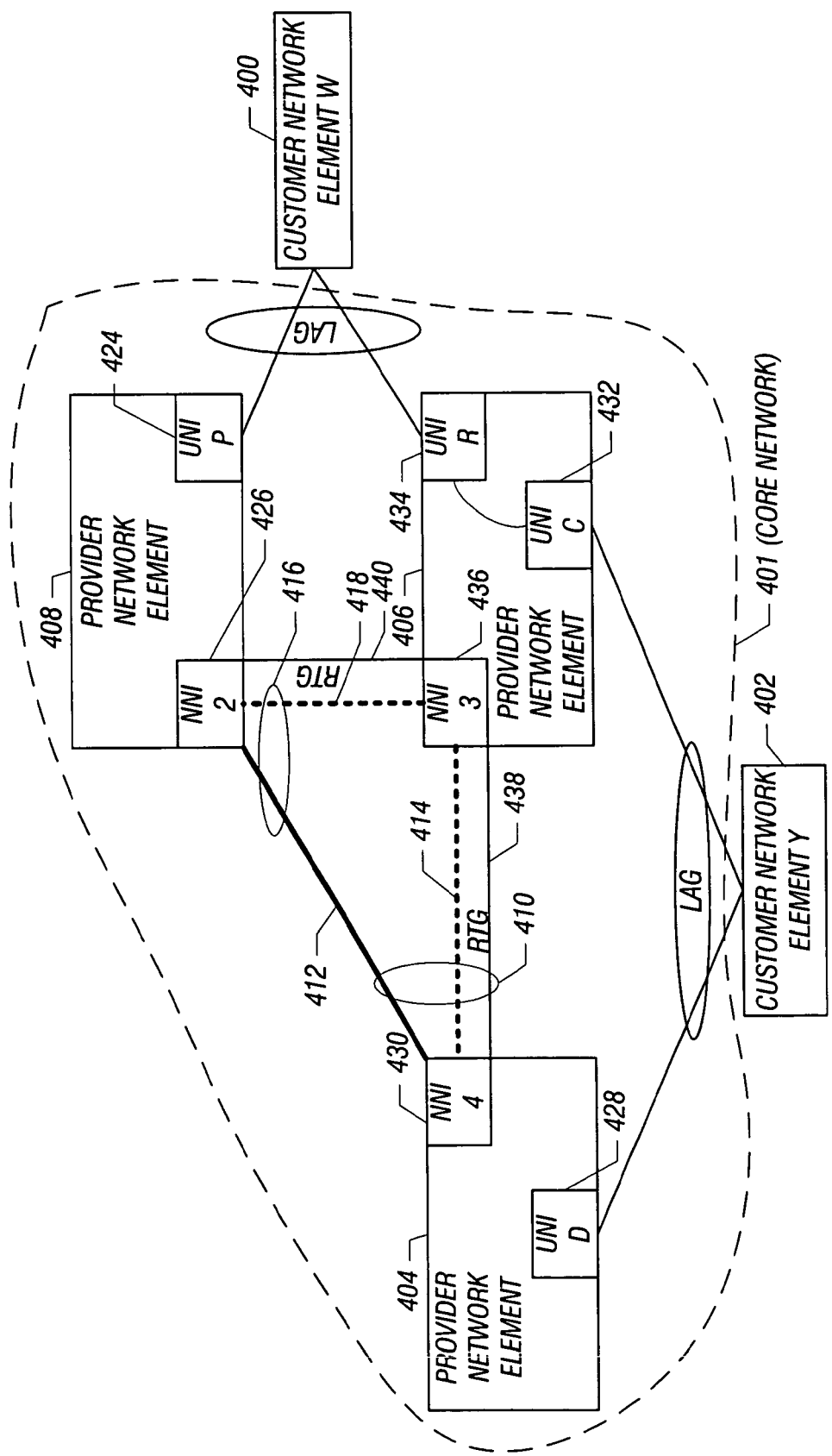

FIG. 4 depicts a hybrid connection configuration of provider network elements 404, 406, and 408 and customer network elements 400 and 402. Three trunk groups are defined in the core network 401, including a first trunk group 410 that has a primary trunk 412 and a secondary trunk 414. A second trunk group 416 has a primary trunk 412 and a secondary trunk 418.

The provider network element has a UNI 424 (labeled "P"), and an NNI 426 (labeled "2"). The provider network element 404 has a UNI 428 (labeled "D") and an NNI 430 (labeled "4"); and the provider network element 406 has a UNI 432 (labeled "C"), a UNI 434 (labeled "R"), and an NNI 436 (labeled "3"). UNIs 424 and 434 are the dual-homed UNIs for the customer network element 400, while the UNIs 428 and 432 are the dual-homed UNIs for customer network element 402.

In the configuration of FIG. 4, the provider network element 406 is connected to both customer network elements 400 and 402, similar to the arrangement of FIG. 3. The other provider network elements 404, 408 are connected to just one of the customer network elements 400, 402. If a data unit from an origination customer network element arrives at a UNI in provider network element 406, then the data unit will be switched to the local destination UNI for routing to the destination customer network element if the local destination UNI is functioning. If the local destination UNI is down, however, then the data unit is sent by the provider network element 406 over a re-route trunk group (either 438 or 440).

On the other hand, when the provider network element 404 or 408 receives a data unit from an origination network element, the provider network element sends the data unit out over a trunk group to a provider network element connected to the destination customer network element (similar to that performed in the arrangement of FIG. 2).

In the example of FIG. 4, there are six possible paths from "Y" to "W":

YCRW
YC32PW
YD42PW
YD43RW
YD423RW
YD432PW

Similar paths extend from "W" to "Y."

Although FIGS. 1-4 describe several alternative arrangements of network elements that provide dual-homed customer network elements and alternate trunk paths through the core network, it is noted that there are many other possible arrangements in which failure protection mechanisms according to some embodiments can be performed.

Figure 5:
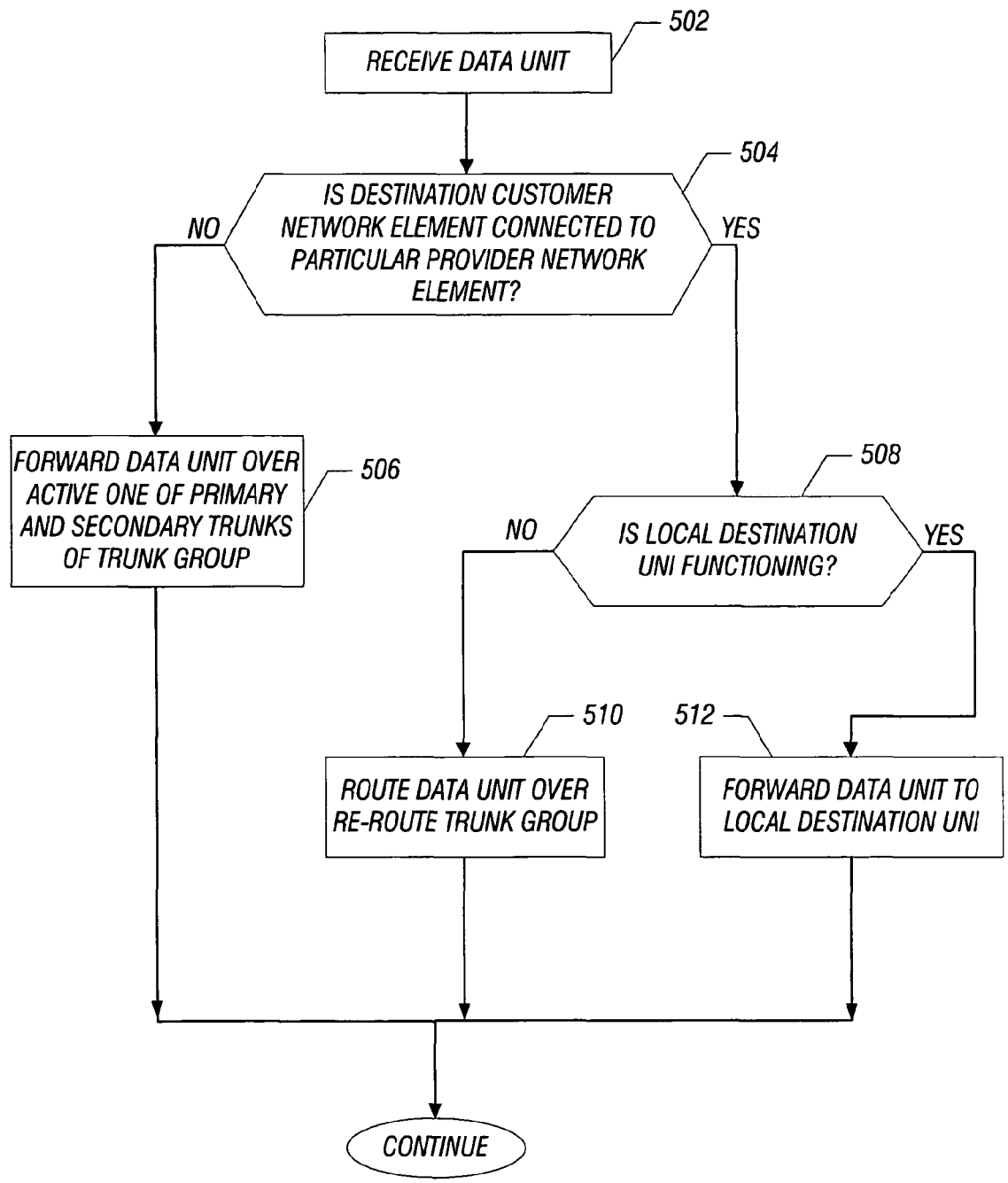
FIG. 5 is a flow diagram performed by a provider network element, according to an embodiment.

FIG. 5 is a flow diagram of a process performed by a particular provider network element according to an embodiment. The process of FIG. 5 is performed by the controller (e.g., 120 or 122 in FIG. 1) in the particular provider network element. In response to receiving (at 502) a data unit, the particular provider network element determines (at 504) whether the destination customer network element is connected to the particular provider network element. If not, the particular provider network element forwards (at 506) the data unit over an active one of a primary trunk and secondary trunk of the trunk group connected to the particular provider network element.

However, if the destination customer network element is determined (at 504) to be connected to the particular provider network element, then the particular provider network element determines (at 508) whether the local destination UNI is functioning. If not, then the particular provider network element routes (at 510) the data unit over a re-route trunk group to another provider network element.

If the particular provider network element determines (at 508) that the local destination UNI is functioning, then the particular provider network element forwards (at 512) the data unit to the local destination UNI for communication to the destination customer network element.

The various tasks discussed above can be implemented in either software or hardware, or in a combination of software and hardware. If implemented as software, then instructions of the software are executable on corresponding processors. Processors include microprocessors, microcontrollers, processor modules or subsystems (including one or more microprocessors or microcontrollers), or other control or computing devices.

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While some embodiments have been disclosed with respect to a limited number of embodiments, those skilled in the art will appreciate numerous modifications and variations there from. It is intended that the appended claims cover such modifications and variations as fall within the true spirit and scope of some embodiments.

What is claimed is:

1. A method of conveying traffic from a network to a customer network element, the method comprising:
   at a first node of the network comprising a first customer interface connected to the customer network element and a first network interface hosting a first trunk group and a re-route trunk:
      when the first customer interface is operational, forwarding data units received by the first network interface and addressed to the customer network element through the first customer interface; and
      when the first customer interface is not operational:
         forwarding data units addressed to the customer network element that are received through the first trunk group to a second node of the network via the re-route trunk; and
         dropping data units addressed to the customer network element that are received at the first network interface on the re-route trunk.

2. The method of claim 1, further comprising forwarding to another node data units received by the first network interface that are not addressed to a customer network element connected to the first node.

3. The method of claim 2, wherein forwarding to another node data units received by the first network interface that are not addressed to a customer network element connected to the first node comprises forwarding the data units on an active trunk.

4. The method of claim 1, wherein the first network interface is a network-to-network interface (NNI).

5. The method of claim 1, wherein the first customer interface is a user-to-network interface (UNI).

6. The method of claim 1, wherein the network uses provider backbone bridging (PBB) to provide a service provider domain and a customer domain.

7. The method of claim 1, wherein the first trunk group comprises at least two trunks, at least one of the trunks being, in normal operation, a working trunk and at least one other trunk being, in normal operation, a protection trunk.

8. The method of claim 1, wherein the first trunk group comprises at least two provider backbone transport (PBT) trunks.

9. The method of claim 1, wherein the second node comprises a second customer network interface connected to the customer network element and a second network interface connected to a second trunk group and to the re-route trunk, the method further comprising:
   at the second node:
      when the second customer interface is operational, forwarding data units received by the second network interface and addressed to the customer network element through the second customer interface; and
      when the second customer interface is not operational, forwarding data units addressed to the customer network element that are received through the second trunk group to the first node via the first re-route trunk.

10. The method of claim 9, further comprising, when the second customer interface of the first node is not operational, dropping data units addressed to the customer network element that are received at the second network interface on the re-route trunk.

11. The method of claim 9, further comprising forwarding to another node data units received by the second network interface that are not addressed to a customer network element connected to the second node.

12. The method of claim 9, wherein the first and second network interfaces are network-to-network interfaces (NNI).

13. The method of claim 9, wherein the first and second customer interfaces are user-to-network interfaces (UNI).

14. The method of claim 13, wherein the customer network element is dual-homed on the first and second customer interfaces, and the first and second customer interfaces comprise an abstract UNI for the customer network element.

15. The method of claim 9, wherein the network uses provider backbone bridging (PBB) to provide a service provider domain and a customer domain.

16. The method of claim 9, wherein each of the first trunk group and the second trunk group comprises at least two trunks, at least one of the trunks being, in normal operation, a working trunk and at least one other trunk being, in normal operation, a protection trunk.

17. The method of claim 9, wherein each of the first trunk group and the second trunk group comprises at least two provider backbone transport (PBT) trunks.

18. The method of claim 9, wherein:
   the first customer interface is connected by a first communication link to the customer network element;
   the second customer interface is connected by a second communication link to the customer network element; and
   the first and second communication links are aggregated into a single logical link.

19. The method of claim 9, wherein the first and second customer interfaces comprise at least part of a group of customer interfaces configured to provide failover rsupport.

* * * * *